United States Patent [19]

Pasley

[11] 4,340,078
[45] Jul. 20, 1982

[54] TANK FOR A FLUID SYSTEM

[75] Inventor: Harry M. Pasley, Fresno, Calif.

[73] Assignee: Eaton Investment Company, Fresno, Calif.; a part interest

[21] Appl. No.: 152,640

[22] Filed: May 23, 1980

[51] Int. Cl.³ ............................................. B05B 7/30
[52] U.S. Cl. .................................. 137/205.5; 137/268; 239/310
[58] Field of Search .......................... 137/205.5, 268; 239/310, 314, 316, 317; 222/500, 501; 422/255, 256, 261, 281, 282

[56] References Cited

U.S. PATENT DOCUMENTS

| | | | |
|---|---|---|---|
| 594,638 | 11/1897 | Manning | 137/268 X |
| 1,783,773 | 12/1930 | Bilde | 222/500 UX |
| 2,604,446 | 7/1952 | Palmer | 137/268 X |
| 2,609,232 | 9/1952 | Taulman | 239/310 X |
| 3,162,427 | 12/1964 | Knudson | 239/310 X |
| 3,833,177 | 9/1974 | Pasley | 239/310 X |

Primary Examiner—Alan Cohan
Attorney, Agent, or Firm—Huebner & Worrel

[57] ABSTRACT

A tank for a fluid system which is pressurized in an operative mode and depressurized in an inoperative mode, the tank having a pressure vessel enclosing a chamber and a substantially annular port in the vessel communicating with the chamber; a mount for securing the vessel in fluid transferring communication with the fluid system through the port with the port disposed in substantially upwardly facing relation; and a substantially spherical flow control element captured in the chamber of the vessel and dimensioned gravitationally to seat in the annular port to allow passage of fluid through the port when the fluid system is in the operative mode, to vent pressure from the chamber upon depressurization of the fluid system and to seal the port when the fluid system is in the inoperative mode.

12 Claims, 5 Drawing Figures

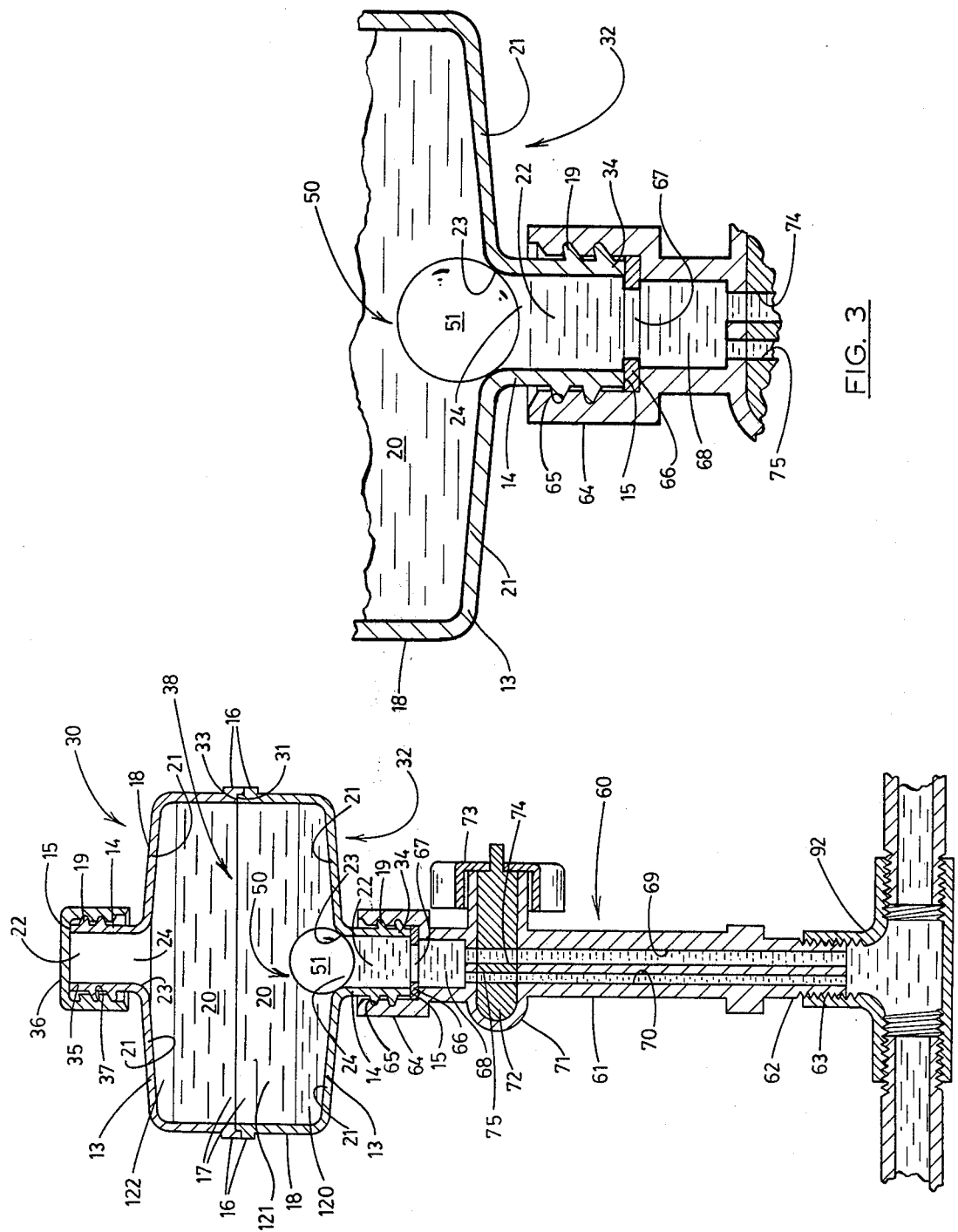

TANK FOR A FLUID SYSTEM

BACKGROUND OF THE INVENTION

1. Field of the Invention

The present invention relates to a tank for a fluid system and more particularly to such a tank which is operable in conjunction with a fluid system to disseminate substances to fluid within the system during operation thereof and to prevent dissemination of the substances to fluid within the system when the system is inoperative.

2. Background of the Invention

It has been known to use a variety of types of devices to disseminate substances to a fluid stream in a multitude of areas of use. For example, it has been known to use sprinkler systems to dispense insecticides, fungicides, herbicides, nutrients, and the like through sprinkler systems. The applicant's U.S. Pat. No. 3,833,177 relates to a fluid disseminating device useful in a host of areas of particular use including the dispensing of such substances through a sprinkler system.

Incident to the dispensing of substances to a fluid stream, is the problem of controlling the period during which such substances are dispensed. It may be desired that the substance be dispensed in a single application wherein the fluid system is operated until all of the substance has been admitted to the fluid stream. However, in many instances this is not desirable and in still other cases it is impractical or impossible to do so.

For example, in the case of a lawn sprinkling system, all of the substance may not have been admitted to the fluid stream before it becomes necessary to turn the sprinkler system off to avoid waste as a result of run off from the lawn area. In other instances, where automatic timers are employed, the sprinkler system will be actuated at odd hours for fixed periods of time. Where the period of operation is not long enough completely to dispense the substance into the fluid stream, the balance of the substance may be wasted by discharge into the system after shut off. Even where such prior art devices have valves or other such controls for retaining the unused substance for later use, it may nonetheless be inconvenient if not impossible to operate such controls at the required time.

A still further problem incident to the use of disseminating devices, particularly where an automatic sprinkler system is involved, is the risk that the concentrated substance will be drawn backward through the fluid system and into the main fluid system by a syphoning action thus contaminating the main water supply and creating a hazardous condition. While city and/or county codes frequently require use of anti-syphon valves to prevent such a hazard, it is known that many, if not most, residences do not have such valves.

Therefore, it has long been known that it would be desirable to have a tank for a fluid system which has the capability for automatically dispensing substances to a fluid stream at a rate as controlled by the operator and which operates dependably and fully automatically to dispense such substances to the fluid stream only during operation of that fluid system preventing loss of the unused portion of the substance and precluding the creation of a hazardous condition.

SUMMARY OF THE INVENTION

In view of the foregoing, it is an object of the present invention to provide an improved tank for a fluid system.

Another object is to provide such a tank which is operable to dispense substances to a fluid stream completely automatically operating only while the fluid system thereof is pressurized.

Another object is to provide such a tank which becomes pressurized during pressurization of the fluid system to which it is attached and which, upon depressurization of the fluid system, automatically purges pressure from the tank and which thereafter substantially precludes discharge of the substance from the tank.

Another object is to provide such a tank which at the time of purging of pressure from the tank does so by expelling substantially all of the fluid from the tank while retaining substantially all of the substance to be dispensed within the tank.

Another object is to provide such a tank which is particularly well suited to operation with the fluid disseminating device of the applicant's U.S. Pat. No. 3,833,177.

Another object is to provide such a tank which has substantially no moving parts subject to wear and is fully dependable in operation without any attention whatsoever.

Another object is to provide such a tank which possesses a capability for being refilled with substances to be dispensed.

Another object is to provide such a tank which possesses a form of construction such that a tank of virtually any size can be produced without in any way detracting from the operative advantages thereof.

Another object is to provide such a tank which is particularly well suited to use with an automatic sprinkler system such that once the tank is filled with the substance to be dispensed and is installed on the fluid system, the tank operates cooperatively with the fluid system to dispense the substance to the fluid stream thereof only during operation of the sprinkler system and which seals upon depressurization of the sprinkler system so as to capture the substance therewithin and prevent further discharge of the substance until the sprinkler system is again pressurized.

Another object is to provide such a tank which prevents syphoning of the substance from the tank back through the sprinkler system and into the main water supply.

Another object is to provide such a tank which can be modified in such a way that the substance within the tank is discharged rapidly into the fluid stream so as to override the automatic features of the tank.

Further objects and advantages are to provide improved elements and arrangements thereof in an apparatus for the purposes described which is dependable, economical, durable and fully effective in accomplishing its intended purposes.

BRIEF DESCRIPTION OF THE DRAWINGS

FIG. 1 is a fragmentary perspective view of the tank of the present invention shown in a representative operative environment attached to a sprinkler system in conjunction with the fluid disseminating device of the applicant's U.S. Pat. No. 3,833,177.

FIG. 2 is a somewhat enlarged fragmentary vertical section taken on line 2—2 in FIG. 1.

FIG. 3 is an enlarged fragmentary vertical section of the tank showing the flow control element thereof in an operative position within the tank.

DESCRIPTION OF THE PREFERRED EMBODIMENT

Figure 1:
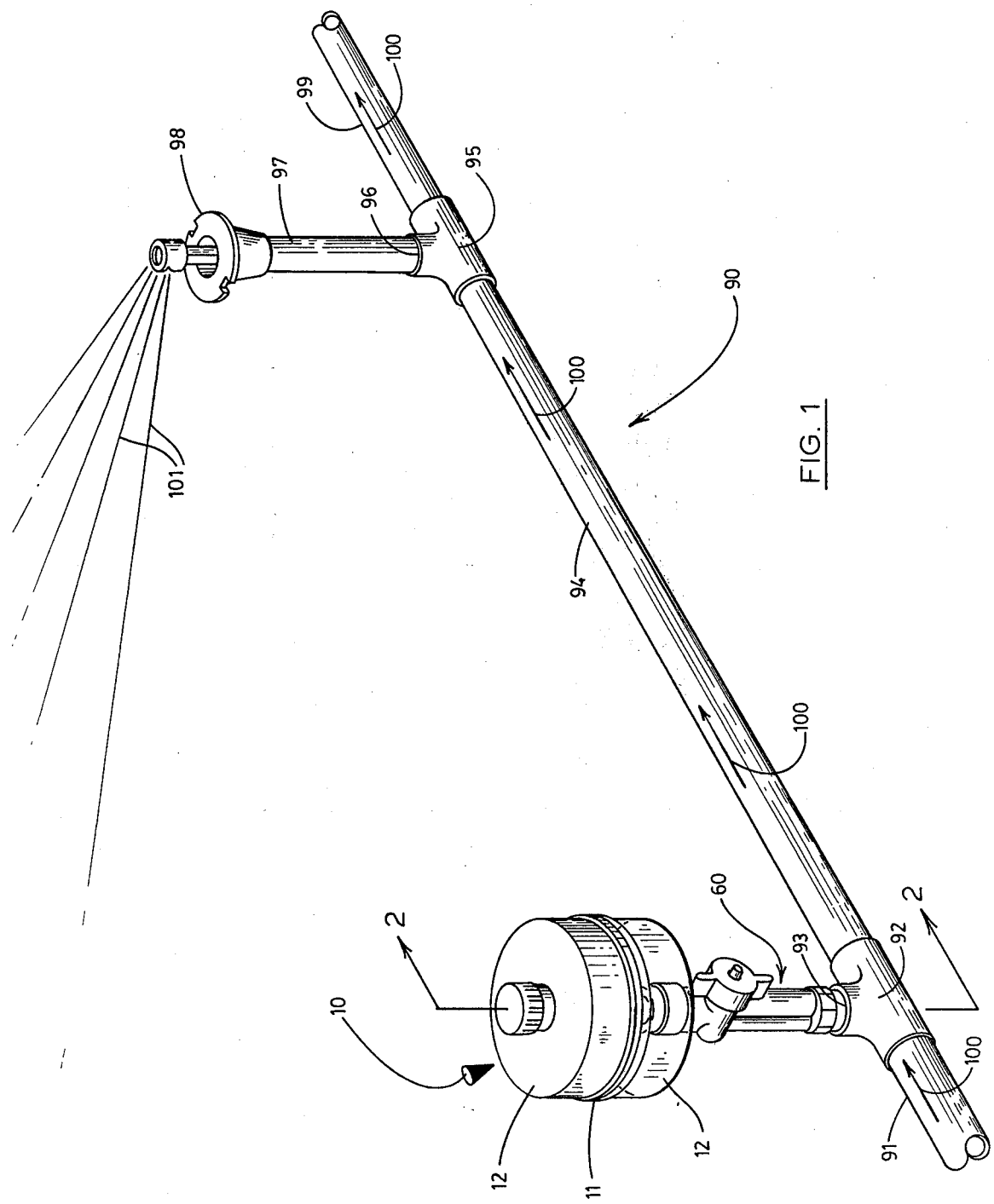

Referring more particularly to the drawings, the tank of the present invention is generally indicated by the numeral 10 in FIG. 1. The tank has a housing or pressure vessel 11 preferably constructed of a pair of substantially identical components 12. The components of the vessel are preferably constructed of a suitable polyvinyl chloride material which can be transparent or opaque.

Each component 12 has a wall 13 constituting a surface of revolution and forming a rough cup or bowl shaped configuration. The wall has a spout 14 terminating in a circular end portion 15. The wall has an opposite circular end portion 16 of substantially larger diameter than that of the spout and bounding a mouth 17 of predetermined diameter for the component.

The wall 13 of each component 12 has a outer surface 18. The outer surface of the spout 14 of the wall has external screw threads 19 extending thereabout. The wall has an inner surface 20 extending from the mouth 17 thereof to the circular end portion 15 of the spout. The inner surface includes a sloped funnel shaped shoulder 21 which extends about and slopes toward a cylindrical passage 22 which extends through the spout 14. The sloped shoulder 21 converges on the passage and into communication therewith to form an annular seat 23 communicating with a passage 22 and defining a port 24. As best shown in FIG. 2, the annular seat is preferably of a rounded configuration in cross section. Thus, a segment of any portion of the seat has a rounded convex surface facing the port 24. For purposes of illustrative convenience, it will be understood that the diameter of the passage 22 in the preferred embodiment is three quarters of an inch [1.905 cm]. However, it will be understood that the diameter of the passage as well as the other dimensions of the tank 10 can be varied so as to suit the needs of the specific operation in which the tank is to be used.

As can best be seen in FIGS. 1 and 2, one of the pair of components 12 of the vessel 11 constitutes an upper component 30 with respect to its attitude and use. Preferably, but not necessarily, the upper component is constructed of opaque polyvinyl chloride treated so as not to be subject to damage by ultraviolet rays. The upper component is machined to form an annular groove 31 in the circular end portion 16 concentric to the mouth 17 thereof.

Similarly, the other of the pair of components 12 of the vessel 11 constitutes a lower component 32 which is preferably, although not necessarily, constructed of transparent polyvinyl chloride treated in such a way as to be resistent to ultraviolet rays. The circular end portion 16 of the lower component is machined to form a ring 33 receivable in fitted, mating relation in the groove 31 of the upper component, as shown in FIG. 2.

The interfitting ring 33 and groove 31 are sonically welded together to form the unitary water tight pressure vessel 11 or, alternatively, are glued together using a suitable polyvinyl chloride adhesive.

The spout 14 of the lower component 32 constitutes a discharge spout 34 for the pressure vessel 11. The spout 14 of the upper component 30 constitutes a filler spout or opening 35 for the vessel. A closure or cap 36, having female screw threads 37, is removably, screw threadably received on the screw threads 19 of the filler spout 35 in sealing relation to the passage 22. When the upper and lower components 30 and 32 are assembled as described, the pressure vessel encloses in fluid tight relation an internal chamber 38 for the vessel.

Captured within the internal chamber 38 is a substantially spherical flow control ball or element 50. The element has a substantially spherical outer surface 51. In the preferred embodiment the element is not precisely a sphere, but is within a relatively close tolerance thereto. In a tank 10 wherein the passage 22 of the discharge spout 34 is three quarters of an inch [1.905 cm] in diameter as heretofore specified, the diameter of the flow control element is preferably, although not necessarily one inch [2.54 cm]. The flow control element is preferably made of any suitable non-ferrous material so as to be non-corrosive. Glass, plastic and ceramic compositions have been found well suited to the purpose. In fact, it has been found that glass balls such as marbles which are very slightly imperfect, or in other words, not perfectly spherical, are excellently suited for use as the flow control element. Conversely, it has been found that more nearly perfect spheres such as ball bearings do not work nearly as well.

What in fact is desired, is a slightly less than perfect engagement between the outer surface 51 of the flow control element 50 and the annular seat 23 of the lower component 32. Since most components of the type shown herein and described are molded and since the tolerances in such mold construction are very precise, it has been found that the annular seat 23 in such components are virtually precisely annular. Therefore, as has been described, the desired slightly imperfect seating of the flow control element in the annular seat is achieved by using a not precisely perfectly spherical flow control element, as heretofore described. Alternatively, however the slightly less than perfect seating engagement can be accomplished by constructing the annular seat so that it is slightly imperfect in shape or by making both the flow control element and the annular seat very slightly imperfect in shape.

Although the tank 10 of the present invention can be used in a variety of environments, it has particular utility when used with the fluid disseminating device indicated at 60 which is the subject of the applicant's U.S. Pat. No. 3,833,177.

The device 60 has a body 61, having a male coupling 62 at one end thereof about which are extended external screw threads 63. The opposite end of the body has a female coupling 64 having internal screw threads 65. An annular rubber seal 66, having an opening 67 extending therethrough, is received within the female coupling. Immediately below the female coupling within the body is a chamber 68. A relatively large diameter passage 69 and a relatively smaller diameter passage 70 extend through the body from the male coupling 62 into communication with the chamber 68, as shown in FIG. 2.

A valve housing 71 is formed in the body 61 extending substantially transversely of the passages 69 and 70 immediately adjacent to the chamber 68. A valve core 72 is received within the valve housing and is rotational therewithin about a longitudinal axis extending in right angular relation to the passages 69 and 70. A handle 73 is affixed on the valve core for rotating the valve core. A relatively large diameter passage 74 and a relatively smaller diameter passage 75 are extended through the valve in side-by-side relation and positioned so as to communicate with the large and small diameter passages 69 and 70 in an opened position shown in FIG. 2. The passages 74 and 75 thereby constitute portions of their corresponding respective passages 69 and 70. It will be understood that the valve core can be rotated so as to move the large and small diameter passages 74 and 75 out of communication with the large and small diameter passages 69 and 70 so as to seal those passages preventing fluid flow beyond the valve core 72 in either direction.

Figure 4:
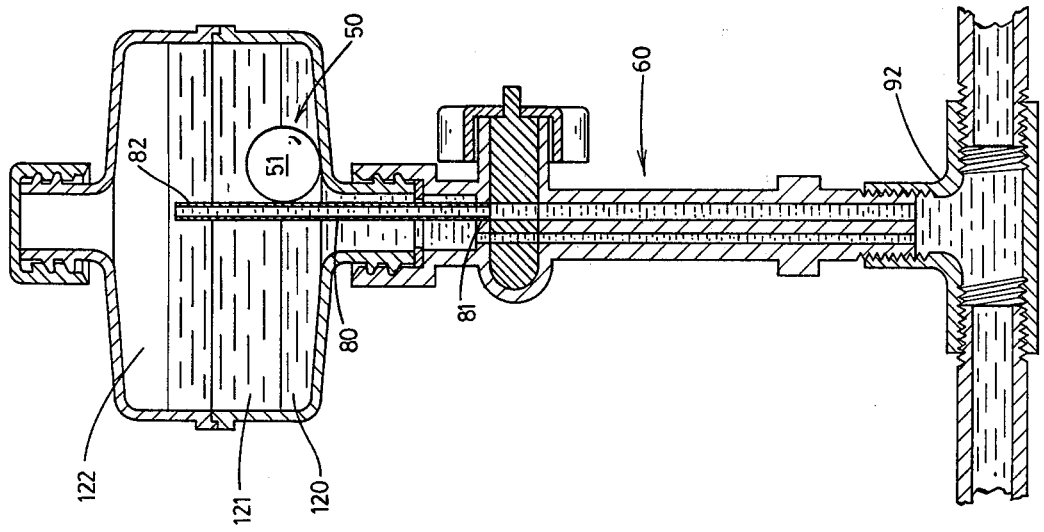
FIG. 4 is a fragmentary vertical section of the tank as shown in FIG. 2, but with a tube inserted in a position to prevent the flow control element from seating in the annular port of the tank.

As shown in FIG. 4, the tank 10 of the present invention includes a member or tube 80, having a lower end portion 81 and an opposite upper end portion 82, with respect to its normal attitude of use. As will hereinafter be described, the tube is adapted, when its use is desired, to be inserted in fitted relation in the large diameter passage 69 so as to mount the upper end portion 82 thereof in a position substantially as shown in FIG. 4.

As will hereinafter become more clearly apparent, the tank of the present invention can be used in dispensing substances to the fluid streams of fluid systems of a wide variety of types. For convenience in illustrating one such use, a sprinkler system 90 is fragmentarily shown in FIG. 1. As shown therein, the sprinkler system has a conduit 91 which, it will be understood, is connected to a source of fluid, in this case water under pressure, for the sprinkler system. A T-coupling 92, having an upwardly facing female coupling 93, is mounted on the conduit. A conduit 94 is connected to the T-coupling 92 and has a second T-coupling 95 mounted on the remote end thereof. The T-coupling 95 has an upwardly facing female coupling 96 in which is mounted a riser 97. A sprinkler head 98 is screw threadably secured on the top of the riser in the conventional fashion. A conduit 99 is connected to T-coupling 95 and extended to the remainder of the sprinkler system in the conventional manner. Arrows 100 illustrate the normal direction of the flow of water through the sprinkler system which, as shown in FIG. 1, is generally from left to right. When the sprinkler system is pressurized with water from the source, in the normal manner, using a control valve, not shown, spray 101 is discharged from the sprinkler head, as shown in FIG. 1.

Figure 5:
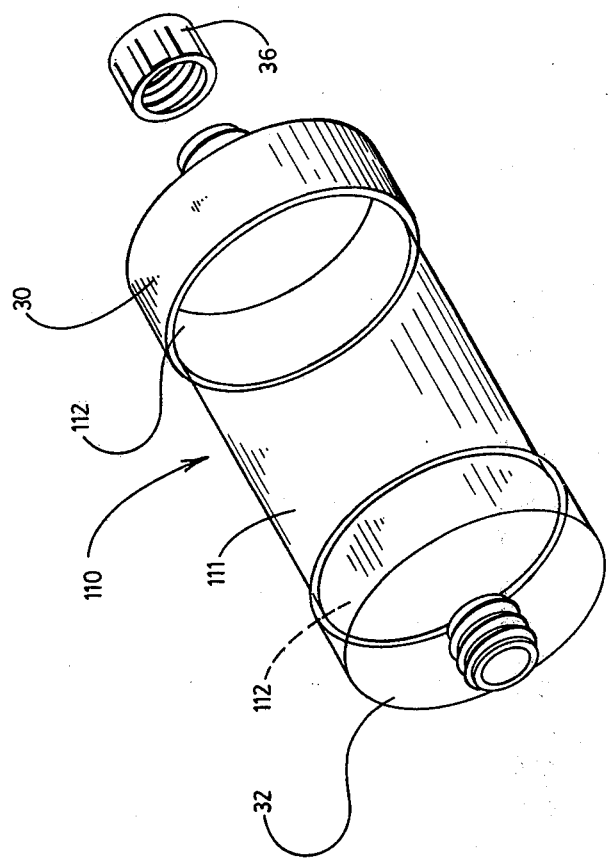
FIG. 5 is a perspective view of a modified form of the tank of the present invention.

The tank 10 of the present invention can be constructed in a variety of different forms without departing from the scope of the invention. Thus, as shown in FIG. 5, a modified form of the tank 10 is shown at 110. The tank includes a cylindrical conduit 111 having opposite end portions 112. The conduit is preferably, although not necessarily, transparent. The conduit has an external or outer diameter adapted for receipt in fitted relation within the mouths 17 of the upper and lower components 30 and 32. The tank 110 is formed by individual insertion of the opposite end portions 112 of the conduit within the respective mouth 17 of the upper and lower components and is then sealed either by sonic welding or by the use of a suitable adhesive. Construction of the tank in this fashion permits a tank 110 of virtually any desired length as selected by the use of a conduit 111 of the desired length. The tank 110 in the preferred embodiment contains a flow control element 50, as heretofore described.

As will be described in greater detail, and as shown in FIG. 2, the tank 10 will be understood during normal operation to contain a lower zone 120 immediately adjacent to the port 24 occupied by fluid, in the illustrative embodiment, water from the source, containing dilute substance to be dispensed to the fluid stream. A middle zone 121 immediately above zone 120 within the tank contains the concentrated substance to be dispensed. An upper zone 122 is immediately above the middle zone 121 within the tank and contains air which has been placed under pressure as a result of pressurization of the fluid system. The respective sizes of the zone during normal operation, of course, depend upon the quantity of the substance to be disseminated which is in the tank before such operation is initiated and the fluid pressure at which the fluid system operates. The sizes of the zones shown in FIG. 2 are intended to be illustrative.

OPERATION

The operation of the described embodiment of the subject invention is believed to be clearly apparent and is briefly summarized at this point.

In the illustrative environment of FIG. 1, the fluid disseminating device 60 is mounted on the T-coupling 92 by tightening of the male coupling 62 in the female coupling 93 of the T-coupling as shown.

The tank 10 is mounted on the female coupling 64 of the fluid disseminating device 60, also as shown in FIG. 1. The discharge spout 34 of the tank 10 is screw threadably received in the female coupling 64 of the fluid disseminating device and tightened into position so that the spout engages the annular rubber seal 66 in sealing relation, as best shown in FIG. 2.

When so mounted, the flow control element 50 within the tank 10 rolls gravitationally down the sloped shoulder 21 and seats in the annular seat 23 in sealing relation to the port 24. Filling of the tank is accomplished by removing the cap 36 and depositing the substance to be disseminated within the internal chamber 38 of the tank through the filler spout 35. Filling of the tank is permitted by engagement of the flow control element 50 in the annular seat 23 of the tank so as to seal the port 24. Although there is a very small space between the element and the annular seat as a result of the very slightly irregular configuration of the element, it has been found that gravity is not a sufficient force to cause the substance to pass through the available space. Where the substance is a liquid, it is believed that the surface tension of the liquid is such as to prevent any leakage through the very small available space. Once the desired quantity of substance has been deposited within the internal chamber of the tank, the cap is reattached in sealing relation to the filler spout 35, as shown in FIG. 2.

The valve core 72 of the fluid disseminating device 60 can either be in the opened or closed position during filling. Normally the valve core is adjusted to the opened position shown in FIG. 2 and left in this position so that the large and small passages 69 and 70 respectively of the disseminating device provide fluid communication between the T-coupling 92 and the chamber 68 of the disseminating device.

So assembled and adjusted, the tank 10, disseminating device 60 and sprinkler system 90 are ready for operation. Where the sprinkler system is operated by timers, the operator need not monitor operation of the tank in any respect assuming the valve core 72 is left in the opened condition shown in FIG. 2. When the timer actuates the main valve, not shown, of the sprinkler system 90, the sprinkler system becomes pressurized with water. In a residential area the water within the sprinkler system may operate at a pressure in the range of roughly 40 to 60 pounds per square inch. Such pressurization of the system causes water under pressure to flow upwardly through the large and small diameter passages 69 and 70 of the fluid disseminating device, through the chamber 68 into the passage 22 of the discharge spout 34 and through the port 24 about the flow control element 50. The tank 10 is thus very quickly pressurized with water from the sprinkler system to create substantially equal fluid pressure throughout the sprinkler system and the tank. Once such pressurization has occured, the pressures within the tank and the fluid system are substantially equalized thereby permitting the flow control element 50 to return to the seated position in the annular seat 23, as shown in FIG. 2, if such pressurization has dislodged it. Normally, however, it has been found that the flow control element remains substantially in the position shown in FIG. 2 during such pressurization and is raised from the seat only very slightly.

As can best be visualized in FIG. 2, when the tank 10 is pressurized by the influx of water, the zones 120, 121, and 122 are formed within the tank. If the substance to be dispensed is a liquid, a solid, or in granular or powder form, it is substantially incompressible. However, the air within the tank, being a gas, is compressible. Water entering the tank upon pressurization, in effect, lifts the substance to be disseminated until the air within the upper zone 122 is compressed to a pressure substantially equaling that of the water pressure within the sprinkler system and thus establishing the three zones such as shown in FIG. 2. Therefore, the quantity of water entering the tank to form the lower zone 120 is substantially only that amount which compresses the air of the upper zone to substantially the water pressure within the sprinkler system. Similarly, as the water pressure within the sprinkler system may fluctuate during operation, so does the quantity of water of the lower zone within the tank and the pressure exerted on the air in the upper zone 122.

If the tank 10 is completely filled with the substance to be disseminated before pressurization of the sprinkler system 90, then of course there is no upper zone 122 when the sprinkler system is pressurized and little or no water enters the tank upon pressurization. Thus, the lower zone 120 within the tank when initially pressurized is very small or nonexistent.

As set forth in the applicant's U.S. Pat. No. 3,833,177, the fluid disseminating device 60 causes an upward fluid movement through the large diameter passage 69 of the body 61 during operation. It has been found that this movement causes water to pass through the port 24 about the flow control element 50 to cause mixing with the substance within the tank. Such mixing occurs within the lower zone 120 by a gradual dilution of the substance in the middle zone 121. The water circulates within the lower zone and passes through the small diameter passage 70 back into the sprinkler system 90. It will be appreciated that such movement is very gradual and causes virtually no movement of the flow control element 50 from the annular seat 23. The flow control element does, however, vibrate slightly in the annular seat. Since the flow control element does not seat perfectly in the annular seat and since the pressure on both sides are substantially equal, the water can, gradually circulate through the port and about the flow control element. Since it is normally desirable to discharge most substances, such as nutrients, insecticides and the like, in a quite dilute mixture over a long period of time, this very gradual operation is normally highly desirable.

The substance is further diluted during movement through the sprinkler system 90 so that at the time of discharge from the sprinkler heads such as sprinkler head 98 of the sprinkler system, the substance has been diluted to such a degree as to be in the optimum form for performing its function without unintended damage to any plant life upon which it falls. For so long as there remains substance in the tank 10 and the sprinkler system is in operation, the action heretofore described continues. Of course, so long as the valve core 72 of the disseminating device 60 remains in the opened condition shown in FIG. 2, the fluid movement continues to be the same whether or not there is substance to be disseminated within the tank.

When the sprinkler system 90 is deactivated and thus depressurized, there is a loss of fluid pressure within the sprinkler system. This creates a pressure differential on opposite sides of the port 24. It has been found that as the pressure within the sprinkler system is reduced to ambience, the flow control element 50 similarly vents pressure from the internal chamber 38 of the tank 10 through the port 24. This is permitted by the very small space available, as a result of the slightly imperfect fit of the flow control element when seated in the annular seat 23. Thus, such venting occurs without the flow control element being removed from the seated position shown in FIG. 2. In other words, it is believed that the pressure itself is the force which bleeds the pressure from the tank and returns pressure in the tank to ambience. However, once such fluid pressure has been vented from the tank and a balance of pressures on opposite sides of the port restored, it has been found that there is no further discharge through the port from the tank. It is believed that because of the very small space available between the flow control element 50 and the annular seat 23, once the pressure differential no longer exists gravity alone is not sufficient to force fluid from the tank through the very small available space. The surface tension of the fluid itself may assist in preventing such a discharge.

This pressure venting action has another effect which can best be visualized with reference to FIG. 2. Where a portion of the substance to be disseminated remains within the tank at the time the sprinkler system is shut off, the bulk of the fluid vented through the port 24 in returning the pressure within the tank to ambience is water and not the remaining substance to be disseminated. Since the lower zone 120 is mostly water with a certain amount of the substance diluted in it and since this is nearest the port, it is this which is expelled from the tank during depressurization. Thus, substantially all of the concentrated substance to be disseminated, which is within the middle zone 121, is retained in the tank after the pressure has been vented. Looking at this operation from another perspective, when the sprinkler system is pressurized, the pressure within the tank is raised to the same degree by water flowing into the tank through the port 24 to form the lower zone 120. When the sprinkler system is depressurized, it is the same quantity of water within this same zone which is expelled from the tank through the port in returning the pressure within the tank to ambience. The size of the lower zone 120 effectively increases during continued operation of the sprinkler system by an influx of water to take the place of the substance to be disseminated which has been consumed so that the remaining concentrated substance is still separated from the port 24 by the water within the lower zone.

Thus, pressure within the tank 10 causes itself to be relieved without any appreciable loss of the substance to be disseminated remaining within the tank. The tank therefore operates, in a sense, as a substitute for an anti-syphon valve by preventing any discharge of the concentrated substance from the tank which could be syphoned back through the sprinkler system, in a direction opposite to that indicated by arrows 101, in a manner which could contaminate the main water supply. Similarly, virtually all of the substance to be disseminated is preserved for use as needed without any attention whatsoever by the operator.

If it becomes desirable to discharge the substance to be disseminated within the tank 10 at a much greater rate of speed, the tube 80 is inserted with its lower end portion 81 in the large diameter passage 69 so as to extend upwardly through the opening 67 of the rubber seal 66. The tank 10 is then screw threadably secured in position as shown in FIG. 4 so that the upper end portion 82 of the tube 80 extends well inwardly into the internal chamber 38 of the tank 10.

The tube thus operates to hold the flow control element 50 out of its normal seated position in the annular seat 23. In this arrangement, the operator closes the valve core 72 using the handle 73 of the fluid disseminating device 60 to prevent flow of fluid therebelow. Thereafter, the internal chamber 38 of the tank is filled with a desired quantity of substance to be disseminated preferably extending to a point above the upper end portion 82 of the tube. The operator then activates the sprinkler system 90 to pressurize the sprinkler system. When this has been performed, the valve core 72, using the handle 73, is returned to the opened position shown in FIG. 4 to allow pressurization of the internal chamber 38 of the tank 10 in the manner heretofore described. Thereafter, the tank operates substantially in the manner heretofore described to disseminate the additive therefrom after being mixed with water flowing through the fluid disseminating device. It is believed that the fluid flow is as heretofore described in that it passes upwardly through the large diameter passage 69, to tube 80 and returns to the interior of the sprinkler system through the small diameter passage 70. In any event a substantially greater quantity of the substance is forced from the tank more quickly and in a less diluted form. Thus, the substance discharged from the sprinkler system is more concentrated and is disseminated more quickly in this arrangement than where the tube 80 is not used.

If it is desired to retain some of the substance within the tank 10 when the sprinkler system 90 is shut off, the valve core 72 is returned to the closed position using the handle 73 so that the passages 69 and 70 are sealed by the valve core prior to shutting off the sprinkler system. Thus, the remainder of the substance within the tank cannot drain into the sprinkler system.

When the tank 110 is assembled as heretofore described and shown in FIG. 5, its operation is substantially identical to that already described. The additional advantage with respect to the tank 110 is that it permits a tank of virtually any desired size to be built by simply selecting a length conduit 111 of the size desired for the particular size tank desired.

Therefore, the tank of the present invention operates conveniently, dependably and automatically to perform its various functions in disseminating virtually any desired substance, whether a liquid, solid, granular, powder or the like, to a fluid system, venting pressure from the tank upon depressurization of the fluid system, preserving the unused portion of the substance for later use and preventing any risk of syphoning of the remaining substance back through the fluid system.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A tank for a fluid system which is pressurized in an operative mode and depressurized in an inoperative mode, the tank comprising a fluid tight vessel enclosing a chamber and having a substantially annular port communicating with the chamber; means for mounting the vessel in fluid transferring communication with the fluid system through the port and with said port disposed in substantially upwardly facing relation; and a substantially spherical flow control element captured in the chamber of the vessel and dimensioned gravitationally to seat in said annular port to allow passage of fluid through the port when the fluid system is in said operative mode and to seal said annular port substantially to prevent the passage of fluid from the chamber through the port when the fluid system is in said inoperative mode and wherein there is a variation in dimension between the substantially annular port and the fluid control element such that when said element is seated in the port, depressurization of the fluid system from said operative mode causes pressure to be purged from the chamber prior to sealing of the port in the inoperative mode.

2. The tank of claim 1 wherein said variation in dimension between the substantially annular port and the flow control element is such that when the chamber of the vessel contains a substance to be disseminated to the fluid system and the fluid system is in said operative mode, the fluid entering the chamber is substantially contained between said substance and the port within the chamber whereby said purging of the pressure from the chamber causes substantially all of said fluid to be expelled through the port from the chamber while retaining substantially all of said substance within said chamber upon said sealing of the port.

3. A tank for attachment on a fluid system which can be pressurized and depressurized, the tank comprising a housing enclosing an internal chamber communicating with the exterior of the housing through a substantially circular port and the housing being sealed so that said chamber is pressurizable through the port; a substantially spherical flow control element captured in the chamber of the housing and dimensioned to seat in the port in substantially sealing relation; and means for mounting the housing on the fluid system with said chamber sealed in fluid transferring communication with the fluid system whereby when the fluid system is pressurized the chamber of the housing is pressurized from the fluid system through the port and when the fluid system is depressurized the pressure within the chamber urges the flow control element to seat in said port.

4. The tank of claim 3 wherein said mounting means is adapted to mount the housing on the fluid system with the port disposed substantially below the chamber of the housing and the housing is shaped so that the flow control element is urged gravitationally to seat in the port.

5. The tank of claim 3 wherein there is a variation in dimension between the substantially circular port and the flow control element such that when the fluid system is depressurized, the pressure within the chamber urges the flow control element to seat in the port allowing pressure first to be purged from the chamber through the port and then substantially sealing said port.

6. The tank of claim 5 in which the fluid system is operable gradually to circulate fluid through the port of the housing during the period in which said system is pressurized and wherein said mounting means of the tank is adapted to mount the housing on the fluid system in an attitude such that the circular port faces substantially in an upward direction for gravitationally receiving the flow control element in seated relation therein whereby during the period in which said system is pressurized the flow control element is gravitationally seated in the circular port and said variation in dimension enhances fluid circulation between the fluid system and the chamber of the housing through the port.

7. The tank of claim 6 wherein said variation in dimension is such that when the chamber of the housing contains a substance to be disseminated to the fluid system and the chamber and fluid system are pressurized, fluid circulates into and from the chamber from the fluid system through the port gradually disseminating the substance to the fluid system and said fluid is substantially contained between said substance and the port while within the chamber whereby when the pressure is purged from the chamber upon depressurization of the fluid system substantially all of said fluid is expelled through the port from the chamber while retaining substantially all of the remaining substance within said chamber upon said sealing of the port.

8. The tank of claim 3 wherein the housing has an opening extending therethrough in spaced relation to said port disposed for the introduction to the chamber of the housing of a substance to be disseminated to the fluid system and the housing has a closure adapted to seal the opening.

9. The tank of claim 3 wherein the housing is composed of a pair of components having individual mating portions interfitted to form said housing with the flow control element captured in the chamber so formed.

10. The tank of claim 3 wherein the housing is composed of a pair of end portions each having a mouth and a tubular central portion having opposite ends dimensioned for individual slidable receipt in the mouths of the end portions for sealing thereabout whereby the volume of the chamber of the housing can be selected at the time of construction of the housing by employing a tubular central portion of appropriate length.

11. The tank of claim 6 including a member dimensioned to be inserted in the fluid system to extend through the substantially circular port of the housing and into the chamber of the housing to displace the flow control element from the port to increase the volume of fluid circulated through said port.

12. The tank of claim 11 wherein a substance to be disseminated to the fluid system is contained in the chamber of the housing and the member is a tube inserted in the fluid system so as to cause fluid to move upwardly therethrough from the fluid system and said tube has an upper end extending to a position within the chamber remote from said port whereby fluid circulates into the chamber therethrough substantially above said substance in the chamber to urge said substance into the fluid system through the port.

* * * * *